United States Patent
De Cnodder et al.

(10) Patent No.: US 7,881,190 B2
(45) Date of Patent: Feb. 1, 2011

(54) METHOD AND APPARATUS FOR DIFFERENTIATING SERVICE IN A DATA NETWORK

(75) Inventors: Stefaan Jozef De Cnodder, Lille (BE); Bart Alfons Peter Van Doorselaer, Melle (BE); Jan Bouwen, Antwerp (BE)

(73) Assignee: Alcatel, Paris (FR)

( * ) Notice: Subject to any disclaimer, the term of this patent is extended or adjusted under 35 U.S.C. 154(b) by 2535 days.

(21) Appl. No.: 10/237,897

(22) Filed: Sep. 10, 2002

(65) Prior Publication Data

US 2003/0048791 A1    Mar. 13, 2003

(30) Foreign Application Priority Data

Sep. 12, 2001    (EP) .................................. 01402342

(51) Int. Cl.
*H04J 1/16*    (2006.01)
(52) U.S. Cl. ........................................ 370/230; 370/412
(58) Field of Classification Search ............ 370/395.42, 370/230, 230.1, 412, 415, 417
See application file for complete search history.

(56) References Cited

U.S. PATENT DOCUMENTS

| | | | |
|---|---|---|---|
| 5,553,061 A | | 9/1996 | Waggener, Jr. et al. |
| 5,583,792 A | * | 12/1996 | Li et al. .................... 709/224 |
| 6,813,243 B1 | * | 11/2004 | Epps et al. ................... 370/235 |
| 6,958,998 B2 | * | 10/2005 | Shorey ................... 370/395.42 |
| 6,961,307 B1 | * | 11/2005 | Aweya et al. ................ 370/230 |
| 7,058,723 B2 | * | 6/2006 | Wilson ........................ 709/235 |

FOREIGN PATENT DOCUMENTS

WO    WO 01/58084 A2    8/2001

OTHER PUBLICATIONS

Dovrolis C et al: "A Case for Relative Differentiated Services and the Proportional Differentiation Model" IEEE Network, IEEE Inc. New York, US, vol. 13, No. 5, Sep. 1999, pp. 26-34, XP000875308.
S. Floyd, et al.: "Random Early Detection Gateways for Congestion Avoidance", Lawrence Berkeley Laboratory, University of California, Aug. 1993 IEEE/ACM Transactions on Networking, pp. 1-22.

* cited by examiner

*Primary Examiner*—Huy D Vu
*Assistant Examiner*—Dady Chery
(74) *Attorney, Agent, or Firm*—Sughrue Mion, PLLC

(57) ABSTRACT

A method and apparatus is disclosed for differentiating service in a data network which supports a plurality of service classes, by implementing a pricing strategy such that revenue for the ISP in non-busy hours in increased. An edge router assigns a predetermined packet service class value, which is either an artificial packet loss probability or an artificial packet delay, to each one of an associated plurality of service classes, of packets in a data stream, the predetermined packet service class value decreasing with the increasing importance degree of each of its associated plurality of service classes. The packets are delayed or dropped according to the predetermined packet service class value and according to a load on the data network.

25 Claims, 2 Drawing Sheets

METHOD AND APPARATUS FOR DIFFERENTIATING SERVICE IN A DATA NETWORK

The present invention relates to a method and apparatus for differentiating service in a data network which supports a plurality of service classes, such that Internet Service Providers can implement a pricing strategy with respect to the plurality of service classes, which results in increased revenues during non-busy hours.

BACKGROUND OF THE INVENTION

The Transmission Control Protocol/Internetwork Protocol (TCP/IP) are two protocols that are designed to connect computer systems that use different operating systems and network technologies. Application or process data communicated by TCP/IP is "packetized" and as it passes through the four layers of the TCP/IP protocol suite. TCP traffic is typically generated from a source connected to a LAN e.g. Ethernet etc., and is aggregated through an Internet Protocol (IP) edge router to an access network that uses a different link layer technology such as Asynchronous Mode Transfer (ATM). (However, the access network need not necessarily be ATM, but could be IP everywhere, Ethernet everywhere etc.) Congestion at the edge router occurs when the bandwidth available in the access network cannot support the aggregated traffic generated from the LAN. While the access network may have its own traffic control mechanism, its effect terminates at edge routers e.g., the interface between two networks, and consequently, the end-to-end performance is not improved.

When congestion occurs in a packet switched system at the edge router, a packet dropping policy for dropping packets in the packet buffer must be implemented. With the introduction of differentiated services in the Internet, Internet Service Providers (ISP's) can differentiate their services (diffserv) such that a user can select the packet delay or packet loss class that the user's packets will experience.

For example, with diffserv, the user can select different service classes, with a low delay or low packet loss probability at a high cost, medium delay or medium packet loss probability at an average cost, and high delay or high packet loss probability at a low cost.

Thus, the Internet Service Providers (ISPs) can differentiate their services, and implement different pricing strategies, such that a better class of service will cost the end user more money.

Since this value is relative, the user will experience very good service during non-busy hours, and bad service in the busy hours, for the same delay or packet loss probability class. Indeed, the selection is relative—and therefore, in non-busy hours all users will choose the inexpensive high delay or high packet loss service class since it will at that moment, deliver good service (in absolute terms).

Since, in non-busy hours, the network will not be loaded heavily and differences in the delay or packet loss service classes may be so small that all users would tend to choose the cheapest high delay or high packet loss probability service class that will offer only marginally a higher delay than the expensive low delay or packet loss probability class service, the overall revenue for the ISP is lower in non-busy hours.

Prior art solutions for addressing the issue of dropping packets in a packet buffer include Rear Dropping, Front Dropping, Priority Dropping, and Random Drop.

Rear Dropping is where packets are dropped from the rear of the buffer (i.e., to drop incoming packets until the buffer is no longer full)—with no regard as to the priority or importance degree of the packet.

Front Dropping drops packets from the front of the queue, which improves both average buffering delay and the overall loss performance for time-constrained traffic, but which again, has no regard as to the priority or importance degree of the packet.

Priority Dropping involves marking incoming packets with a priority marker (establishing classes of packets) and dropping low priority packets. Although this policy decreases the probability of dropping high priority packets, it accomplishes this result at the expense of increasing the probability of dropping low priority packets.

Random Drop, also known as Random Early Detection or Random Early Drop (RED) (see "Random Early Detection Gateways for Congestion Avoidance", Sally Floyd and Van Jacobsen, 1993 IEEE/ACM Transactions on Networking), calculates a drop probability based on the queue size (or level of congestion), and will assign a large drop probability for large queue sizes, and small drop probabilities to small queue sizes. Mostly, the drop probability increases linearly with the level of congestion. This means that in times of low congestion, the queues are small, and thus, also the drop probabilities. This results in the fact that there is almost no difference between the different packet types/priorities: all packets have small drop probabilities. Here, the importance degree is taken into account: packets with a lower importance degree get for instance, a drop probability which is 5 times larger compared to the packets with a high importance degree.

Specifically, the RED scheme drops packets before the buffer becomes saturated. The buffer is monitored and when the average buffer occupancy goes beyond a particular threshold, packets are dropped according to a random test (e.g. with a certain probability which is a function of the average buffer occupancy (moving time average)), which causes TCP connections to cut their windows randomly. This is particularly effective to de-synchronize the windows. Specifically, in a FIFO-RED scheme, those connections that use the link more are likely to have more packets dropped and consequently, its corresponding window size-cut. This tends to reduce the bias for these higher rate connections. Because the RED algorithm allows the dropping of packets without regard to the characteristics of a flow, packets may be dropped in a flow that is critical for system performance but is not responsible for congestion in the system. Overall system performance will benefit by increasing drop probabilities for flows that are causing the congestion.

Other approaches have focused on preferences by certain users. That is, a flow owned by a preferred user can have a drop probability curve (i.e., higher-priority queue) with lower values as compared with a curve associated with a non-preferred user. As a result, flows belonging to a preferred user may benefit, but system performance is not enhanced.

However, the problem with all these approaches is that they only control packet loss and do not address revenues generated for the ISP. Specifically, irregardless of the type of packet drop policies which are implemented above, in non-busy hours, the user's choice of the cheapest high delay or high packet loss probability decreases the overall revenue for the ISP.

Accordingly, finding a way to drop packets such that low priority packets have a guaranteed non-negligible drop probability, or delay, such that service is better differentiated between the different service classes in both busy and non-busy hours, and the ISP can provide better "absolute" packet loss probability values or delay service values at increased revenues, is needed.

SUMMARY OF THE INVENTION

An object of the present invention is to differentiate service in a data network which supports a plurality of service classes, by implementing a pricing strategy such that revenue for the ISP in non-busy hours in increased. The method of differentiating service includes assigning a predetermined packet service class value to each one of an associated plurality of service classes, of packets in a data stream, the predetermined packet service class value being different according to an importance degree of each of its associated plurality of service classes; and either delaying or dropping the packets according to the predetermined packet service class value and according to a load on the data network.

The predetermined packet service class value is either a packet loss probability or a packet delay, which can vary with time, and which decreases with the increasing importance degree of each of its associated plurality of service classes. Further, when the network is heavily loaded, the packet loss probability or packet delay is relatively smaller than when the network is lightly loaded.

The method is implemented using a classifier, such as a computer, edge router etc., which assigns the predetermined packet service class value by using a loss/delay monitoring mechanism such as queue monitoring.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS

The present invention relates to differentiating service in a data network which supports a plurality of service classes, such that the Internet Service Provider (ISP) can implement a pricing strategy which increases revenue during non-busy hours.

Figure 1:
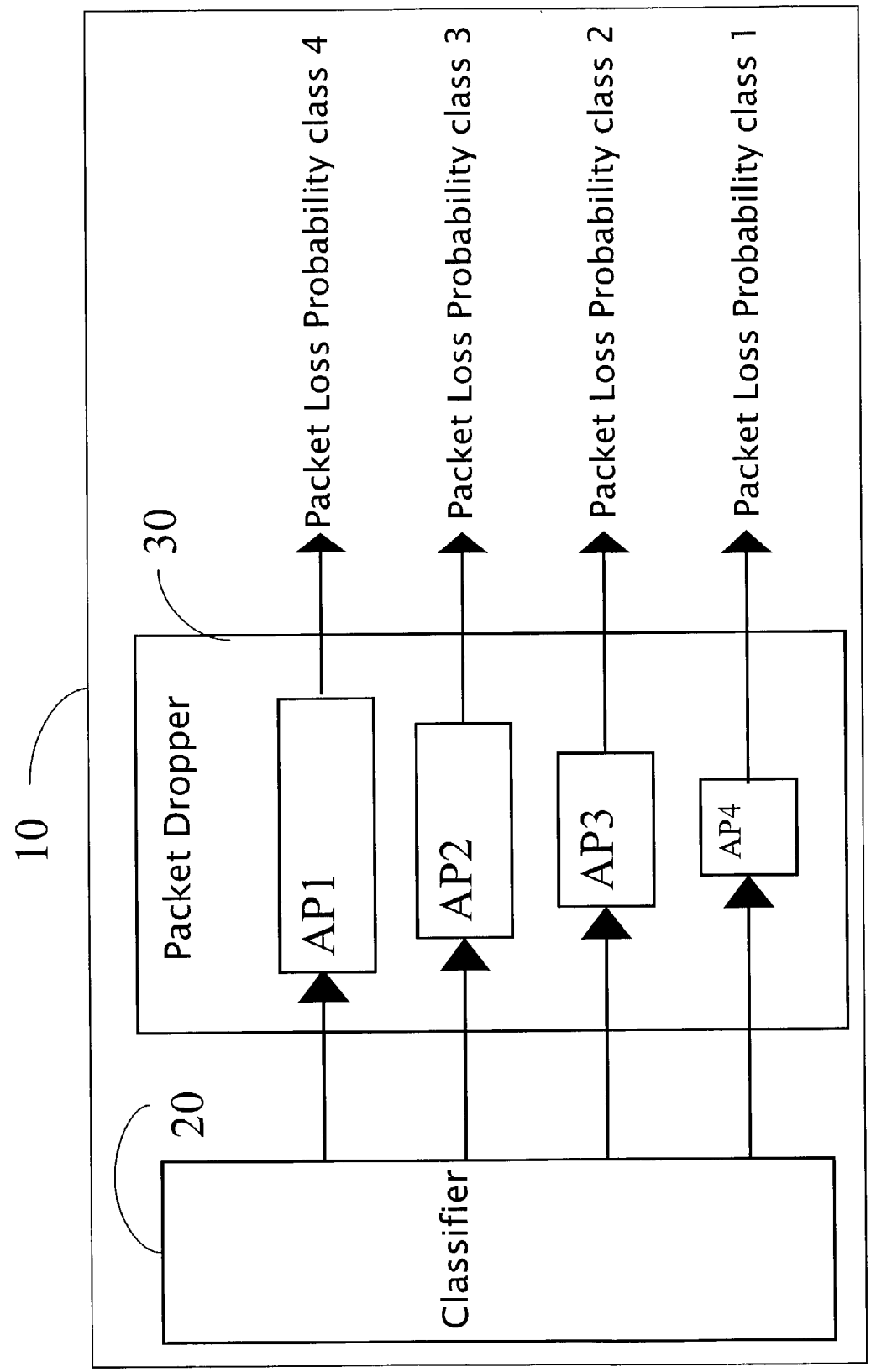
FIG. 1 shows a schematic diagram of the artificial packet loss probability mechanism according to one aspect of the present invention.
Figure 2:
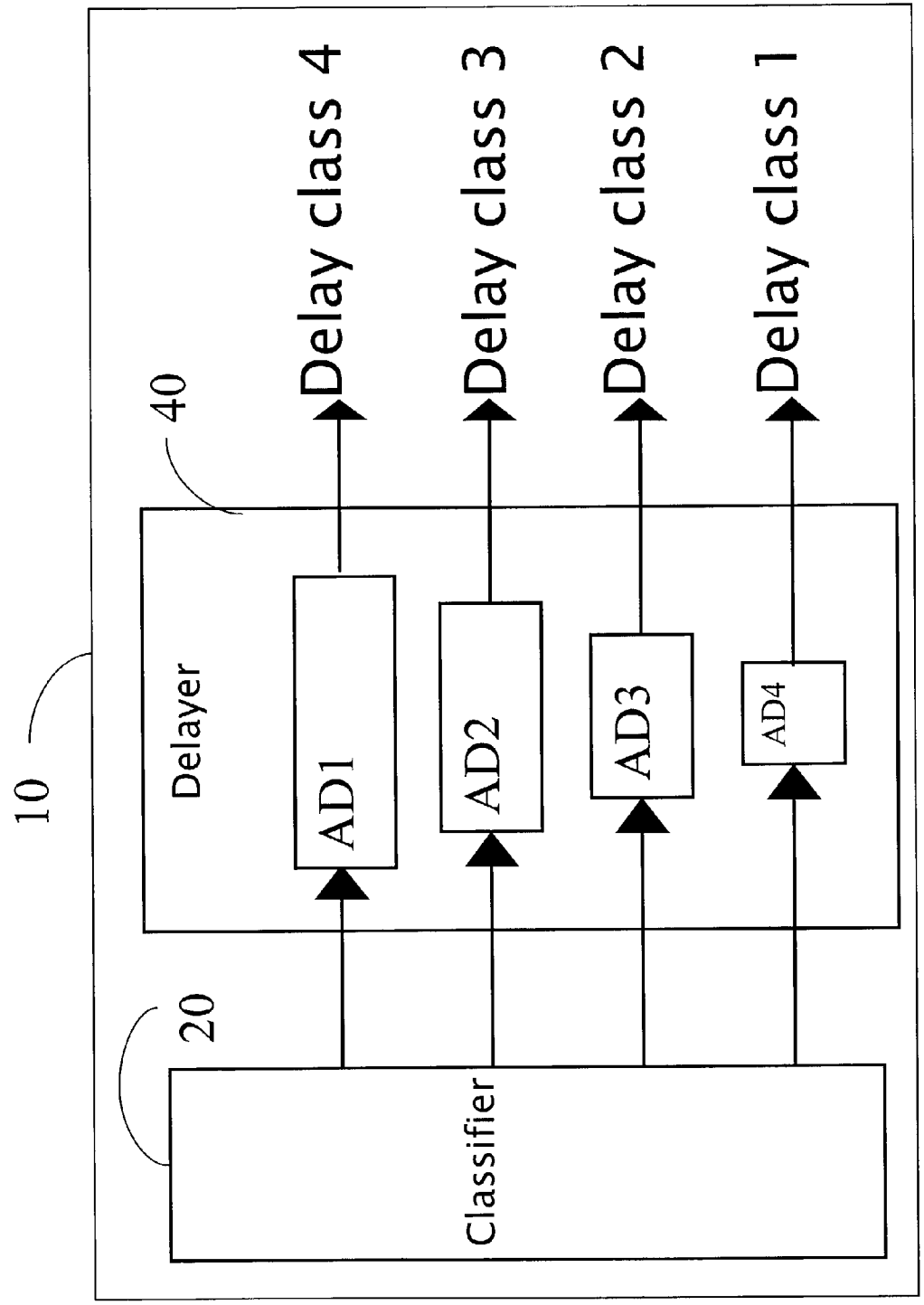
FIG. 2 shows a schematic diagram of the artificial packet delay mechanism according to another aspect of the present invention.

As shown in FIGS. 1 and 2 in different aspects of the present invention, the apparatus 10 for differentiating service in the data network having a plurality of service classes (shown as service classes 1-4), includes a classifier 20, which can be a computer, core router, edge router, etc., having a means for differentiating between packets (i.e., a packet service class differentiation device) which is either a means for dropping packets (i.e., packet dropper 30 (see FIG. 1)) or a means for delaying packets (i.e., packet delayer 40 (see FIG. 2)).

Specifically, the present invention adds another layer to the prior art packet drop or packet delay schemes discussed in the Background section, by having the ISP introduce at the edge router 20 using the packet dropper 30 or packet delayer 40, a predetermined packet service class value, which is either a predetermined or artificial packet loss probability (AP in FIG. 1) or artificial packet delay (AD in FIG. 2), and which is associated with a specific service class based on the type of service (TOS)-byte in the IP packet. The predetermined packet service class value (i.e., packet loss probability or packet delay) decreases with the increasing importance degree or priority of each of its associated plurality of service classes.

In other words, for every packet loss service class or packet delay, a predetermined value (artificial packet loss probability or artificial packet delay) is assigned to every IP packet by the packet service class differentiation device (i.e., packet dropper 30 or packet delayer 40) at the edge router 20. Thus, the packet going into the packet dropper 30 or packet delayer 40 leaves with a loss probability or delay depending on the service class of the packet, with the best class having a smaller delay or loss probability than the lowest class.

To explain further how the artificial packet loss probability and artificial packet delay are implemented, the artificial drop ranges during uncongested periods which can be added include, for example: best class with no drop, medium class 1% drop, and low class 3% drop. The same applies for the delay, for example: best class has no additional delay, medium class a minimum delay of 5 ms and low class a minimum delay of 10 ms. The specified drops and delays are per hop and are added to the actual packet delays experienced or the loss probability class chosen by the user.

Therefore, in the case of a low delay class the packet has to travel across three hops, and the minimum delay is 30 ms. It could also be summed across the whole network: i.e., a minimum delay of 30 ms or a minimum loss probability of 10% for the low priority packets over the network, in addition to the actual delays or loss probability class chosen by the user.

In another aspect of the invention, this predetermined value for the artificial packet loss probability or artificial delay may vary over time.

With respect to the time-dependent artificial packet delays, an artificial delay of 10 ms has two meanings: 1) every packet has an additional delay of 10 ms, irrespective of the amount of delay it already has encountered. In times of congestion, when the queue is full, the packet could have a queuing delay of 7 ms. With the artificial delay, the total delay would be 17 ms. This is a time-dependent artificial delay. 2) For the same example, the artificial delay could be a maximum (10 ms minus the queuing delay). With the above example, the real artificial delay for that particular packet would be 3 ms. This is a time-dependent artificial delay because the queuing delay varies with time.

Time-dependent artificial packet loss probability works the same way as the time-dependent artificial packet delays, with the addition of a predetermined packet loss probability to a chosen packet loss probability class, or the implementation of a maximum artificial packet loss probability (i.e., the addition of the artificial packet loss probability to the chosen packet loss probability does not exceed a maximum value).

In yet another aspect of the present invention, packets are delayed or dropped not only according to the predetermined packet service class value, but also according to the load on the data network. When the data network is heavily loaded, the artificial packet loss probability or artificial delay may be very small or non-existent. When the network is lightly loaded, the artificial packet loss probability or artificial packet delay may be rather high.

In yet another aspect of the invention, the time-dependent values of the artificial packet loss probabilities or artificial delays may be introduced by operator intervention, or may be calculated by the edge device (i.e., edge router 20) to which the packet dropper 30 or delayer 40 belongs. In the latter case, the edge device will be able to measure or estimate the packet loss probability or packet delay for the different service classes in the network by known loss/delay monitoring means or mechanisms. In commercial products, loss/delay monitoring means include queue monitoring, which uses counters to count the number of accepted packets A and count the number of dropped packets B of each class. The drop probability of each class is then the ratio B/(A+B).

Thus, with the addition of an artificial packet loss probability or artificial packet delay, the end-user will experience at any time a significant difference between the different service classes. In other words, although the user will experience the disadvantage of the lowest service classes being worse, the user will better experience the difference between the different service classes, both in busy and non-busy hours.

In summary, contrary to conventional packet dropping schemes which treat all packets equally when congestion is very low (i.e., no packets are dropped, for example, with rear dropping or random drop, and good paying customers and bad paying customers receive the same quality), the present invention provides for increased revenue for the ISP by giving the bad paying customers a minimum drop rate, even during periods of very low congestion. Thus, even when the queue is completely empty, the packet dropper can start dropping packets due to the additional artificial loss probability. When congestion increases, random drop increases cause differentiation between the customers, and thus, the artificial loss probability or artificial drop may (but does not need to) decrease.

Accordingly, when the predetermined or artificial packet loss probability or packet delay mechanism is properly engineered and introduced into the network, the ISP will be able to provide better "absolute" packet loss probability values or delay service values instead of "relative" packet loss probability values or "relative" delay service values. Better differentiation between service classes will be implemented, and will result in a higher income for the ISP in non-busy hours.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A method of differentiating service in a data network which supports a plurality of service classes, the method comprising:
    assigning a predetermined packet service class value to each one of an associated plurality of service classes, of packets in a data stream, said predetermined packet service class value being different according to an importance degree of each of its associated plurality of service classes; and
    one of delaying and dropping the packets according to said predetermined packet service class value and according to a load on the data network;
    wherein said predetermined packet service class value is a packet loss probability which decreases with the increasing importance degree of each of its associated plurality of service classes; and
    when the data network is heavily loaded, the packet loss probability is relatively smaller than when the data network is lightly loaded.

2. The method of differentiating service according to claim 1, wherein the packet loss probability varies with time.

3. The method of differentiating service according to claim 2, wherein an operator introduces time-dependent values for the packet loss probability.

4. The method of differentiating service according to claim 2, wherein the packet loss probability varies with time by adding a predetermined amount of delay to an existing delay.

5. The method of differentiating service according to claim 2, wherein the packet loss probability varies with time by subtracting a predetermined amount of delay from an existing delay.

6. The method of differentiating service according to claim 1, wherein an edge router performs the assigning step.

7. The method of differentiating service according to claim 6, wherein the edge router performs the assigning step by using queue monitoring.

8. A method of differentiating service in a data network which supports a plurality of service classes, the method comprising:
    assigning a predetermined packet service class value to each one of an associated plurality of service classes, of packets in a data stream, said predetermined packet service class value being different according to an importance degree of each of its associated plurality of service classes; and
    one of delaying and dropping the packets according to said predetermined packet service class value and according to a load on the data network;
    wherein said predetermined packet service class value is a packet delay which decreases with the increasing importance degree of each of its associated plurality of service classes;
    the packet delay varies with time; and
    when the data network is heavily loaded, the packet delay is relatively smaller than when the data network is lightly loaded.

9. The method of differentiating service according to claim 8, wherein an operator introduces time-dependent values for the packet delay.

10. An apparatus which differentiates service in a data network which supports a plurality of service classes, comprising:
- a classifier having a packet service class differentiation device;
- wherein said packet service class differentiation device assigns a predetermined value, which is associated with each one of the plurality of service classes, to packets in a data stream;
- said predetermined value is varied according to an importance degree of each of its associated plurality of service classes and according to a load on the data network;
- the packet service class differentiation device is a packet dropper, and said predetermined value is a packet loss probability which decreases with the increasing importance degree of each of its associated plurality of service classes; and
- when the data network is heavily loaded, the packet loss probability is relatively smaller than when the data network is lightly loaded.

11. The apparatus according to claim 10, wherein the packet loss probability varies with time.

12. The apparatus according to claim 10, wherein said classifier is an edge router.

13. The apparatus according to claim 12, wherein the edge router uses queue monitoring to determine said predetermined value.

14. An apparatus which differentiates service in a data network which supports a plurality of service classes, comprising:
- a classifier having a packet service class differentiation device;
- wherein said packet service class differentiation device assigns a predetermined value, which is associated with each one of the plurality of service classes, to packets in a data stream;
- said predetermined value is varied according to an importance degree of each of its associated plurality of service classes and according to a load on the data network;
- the packet service class differentiation device is a packet delay device, and said predetermined value is a packet delay which decreases with the increasing importance degree of each of its associated plurality of service classes;
- the packet delay varies with time; and
- when the data network is heavily loaded, the packet delay is relatively smaller than when the data network is lightly loaded.

15. A router for use in a data network which supports a plurality of service classes, comprising:
- a packet service class differentiation device which assigns a different predetermined value associated with each of one of the plurality of service classes, to packets in a data stream;
- wherein said predetermined value is varied according to an importance degree of each of its associated plurality of service classes and according to a load on the data network;
- the packet service class differentiation device is a packet dropper, and said predetermined value is a packet loss probability which decreases with the increasing importance degree of each of its associated plurality of service classes; and
- at least one packet loss probability associated with at least one of said plurality of service classes having a low degree of importance is maintained above a predetermined minimum value which is not varied according to the load on the data network.

16. The router according to claim 15, wherein the packet loss probability varies with time.

17. The router according to claim 15, wherein the packet loss probability is per hop.

18. The router according to claim 15, wherein the packet loss probability is summed over the network.

19. The router according to claim 15, wherein the router is an edge router, and the edge router assigns the predetermined value by using queue monitoring.

20. A router for use in a data network which supports a plurality of service classes, comprising:
- a packet service class differentiation device which assigns a different predetermined value associated with each of one of the plurality of service classes, to packets in a data stream;
- wherein said predetermined value is varied according to an importance degree of each of its associated plurality of service classes and according to a load on the data network;
- the packet service class differentiation device is a packet delay device, and said predetermined value is a packet delay which decreases with the increasing importance degree of each of its associated plurality of service classes;
- the packet delay varies with time; and
- at least one packet loss probability associated with at least one of said plurality of service classes having a low degree of importance is maintained above a predetermined minimum value which is not varied according to the load on the data network.

21. The router according to claim 20, wherein the packet delay is per hop.

22. The router according to claim 20, wherein the packet delay is summed over the network.

23. A method of implementing a pricing strategy in a data network which supports a plurality of service classes, characterized in that the method comprises the steps of:
- assigning a predetermined packet service class value to each one of an associated plurality of service classes, of packets in a data stream, said predetermined packet service class value being different according to an importance degree of each of its associated plurality of service classes; and
- one of delaying and dropping the packets according to said predetermined packet service class value and according to a load on the data network;
- wherein said predetermined packet service class value is a packet loss probability which decreases with the increasing importance degree of each of its associated plurality of service classes; and
- at least one packet loss probability associated with at least one of said plurality of service classes having a low degree of importance is maintained above a predetermined minimum value which is not varied according to the load on the data network.

24. The method of differentiating service according to claim 23, wherein said predetermined packet service class value is a packet delay which decreases with the increasing importance degree of each of its associated plurality of service classes.

25. A method of increasing revenue in non-busy hours of a data network which supports a plurality of service classes, characterized in that the method comprises the steps of:

assigning a predetermined packet service class value to each one of an associated plurality of service classes, of packets in a data stream, said predetermined packet service class value decreasing according to an increasing priority of each of its associated plurality of service classes; and one of delaying and dropping the packets according to said predetermined packet service class value and according to a load on the data network;

wherein at least one packet loss probability associated with at least one of said plurality of service classes having a low degree of importance is maintained above a predetermined minimum value which is not varied according to the load on the data network.

* * * * *